United States Patent
Liu et al.

(10) Patent No.: US 9,858,008 B2
(45) Date of Patent: Jan. 2, 2018

(54) METHOD TO REDUCE FLASH MEMORY IOS WITH HOST MAINTAINED ADDRESS MAPPING TABLE

(71) Applicant: ScaleFlux, San Jose, CA (US)

(72) Inventors: Yang Liu, Milpitas, CA (US); Hao Zhong, Los Gatos, CA (US); Fei Sun, Irvine, CA (US); Tong Zhang, Watervliet, NY (US)

(73) Assignee: ScaleFlux, San Jose, CA (US)

( * ) Notice: Subject to any disclaimer, the term of this patent is extended or adjusted under 35 U.S.C. 154(b) by 148 days.

(21) Appl. No.: 14/919,361

(22) Filed: Oct. 21, 2015

(65) Prior Publication Data

US 2016/0124649 A1 May 5, 2016

Related U.S. Application Data

(60) Provisional application No. 62/072,974, filed on Oct. 30, 2014.

(51) Int. Cl.
*G06F 3/06* (2006.01)
*G06F 12/02* (2006.01)

(52) U.S. Cl.
CPC .............. *G06F 3/064* (2013.01); *G06F 3/061* (2013.01); *G06F 3/0679* (2013.01); *G06F 12/02* (2013.01)

(58) Field of Classification Search
CPC ........ G06F 3/0679; G06F 3/061; G06F 3/064; G06F 12/02; G06F 3/0659
See application file for complete search history.

(56) References Cited

U.S. PATENT DOCUMENTS

| | | | | |
|---|---|---|---|---|
| 2008/0307158 | A1* | 12/2008 | Sinclair | G06F 12/0246 711/103 |
| 2014/0032796 | A1* | 1/2014 | Krause | G06F 12/0831 710/29 |
| 2014/0208004 | A1* | 7/2014 | Cohen | G06F 12/0246 711/103 |
| 2014/0208007 | A1* | 7/2014 | Cohen | G06F 3/0608 711/103 |
| 2014/0215129 | A1* | 7/2014 | Kuzmin | G06F 12/0246 711/103 |

* cited by examiner

*Primary Examiner* — Hashem Farrokh
(74) *Attorney, Agent, or Firm* — Hoffman Warnick LLC

(57) ABSTRACT

A system, method and program product for transferring contiguous blocks of data between a host storage and a flash memory. A method is disclosed that includes: receiving from a host at a flash controller a host command that specifies a contiguous set of LBAs and specifies a corresponding subsection of an LBA to PBA mapping table; fetching the sub-section of the LBA to PBA mapping table from the host and storing the sub-section in a sub-mapping table; and for each LBA in the contiguous set of LBAs, performing a look-up into the sub-mapping table to retrieve a corresponding PBA and using the corresponding PBA to effectuate a data transfer between the host and flash memory from the flash controller.

18 Claims, 4 Drawing Sheets

METHOD TO REDUCE FLASH MEMORY IOS WITH HOST MAINTAINED ADDRESS MAPPING TABLE

PRIORITY CLAIM

This application claims priority to U.S. Provisional Patent Application Ser. No. 62/072,974, filed Oct. 30, 2014, which is hereby incorporated herein as though fully set forth.

TECHNICAL FIELD

The present invention relates to the field of storage systems and particularly to providing data transmission efficiency when flash cache with a host-maintained address mapping table is used.

BACKGROUND

In computing, applications running in the host use logical block addresses (LBAs) to specify the location of blocks of data stored on computer storage devices, such as a hard drive disk or flash memory. Flash memory is an electronic non-volatile data storage medium that can be electrically erased and reprogrammed. Because the physical block address (PBA) of flash memory is different from an associated LBA, either a host flash driver or flash controller firmware needs to translate an LBA into a PBA for writing data to or reading data from flash memory.

For example, FIG. 1 shows an embodiment involving a host 10 and an external storage system 11 that includes a flash controller 16 and flash memory 18. As can be seen, file system 20 within the host 20 stores data using LBAs, whereas flash memory 18 stores data using PBAs. Because data blocks are potentially being moved and shuffled around in flash memory 18, LBA to PBA mapping table 14 is required to properly reference blocks between the host file system 20 and external flash memory 18. In this embodiment, the LBA to PBA mapping table 14 resides within and is maintained within a local memory (i.e., flash driver 12) of the host 10. If host 10 wants to move data with multiple blocks between host file system 20 and flash memory 18, the host needs to issue a separate command for each block. Accordingly, multiple commands are thus required to process contiguous LBAs since flash memory 18 requires the PBA of each block. This unfortunately results in a high amount of input/output (IO) traffic between host 10 and external flash memory 18, particularly in cases where certain blocks of data are being regularly accessed.

SUMMARY

Accordingly, embodiments of the present disclosure are directed to a system and method of reducing storage inputs/outputs (IOs) between a host and flash memory due to the address mapping between LBAs and PBAs. The method includes downloading a sub-section of a complete address mapping table from host memory into a flash controller; converting LBAs to PBAs with a sub-mapping table in the flash controller; and initiating direct memory access (DMA) from the flash controller with the LBAs and converted PBAs. The LBAs are continuous once they are allocated for an application data command.

In a first aspect, the invention provides a method of transferring contiguous blocks of data between a host storage and a flash memory, comprising: receiving from a host at a flash controller a host command that specifies a contiguous set of LBAs and specifies a corresponding sub-section of an LBA to PBA mapping table; fetching the sub-section of the LBA to PBA mapping table from the host and storing the sub-section in a sub-mapping table; for each LBA in the contiguous set of LBAs, performing a look-up into the sub-mapping table to retrieve a corresponding PBA and using the corresponding PBA to effectuate a data transfer between the host and flash memory from the flash controller.

In a second aspect, the invention provides a computing infrastructure for transferring contiguous blocks of data between a host storage and a flash memory, comprising: a command interpretter that receives a host command from a host that specifies a contiguous set of LBAs and specifies a sub-section of an LBA to PBA mapping table; a system for fetching the sub-section of the LBA to PBA mapping table from the host and storing the sub-section in a sub-mapping table within a flash controller; a system for performing a look-up into the sub-mapping table to retrieve a corresponding PBA for each LBA in the contiguous set of LBAs; and a system for using the corresponding PBA for each LBA to effectuate a data transfer between the host and flash memory from the flash controller.

In a third aspect, the invention provides a computer program product stored on a non-transitory computer readable medium, which when executed by a processing core provides an infrastructure for transferring contiguous blocks of data between a host storage and a flash memory, comprising: programming logic that processes a host command from a host that specifies a contiguous set of LBAs and specifies a sub-section of an LBA to PBA mapping table; programming logic that fetches the sub-section of the LBA to PBA mapping table from the host and stores the sub-section in a sub-mapping table within a flash controller; programming logic for performing a look-up into the sub-mapping table to retrieve a corresponding PBA for each LBA in the contiguous set of LBAs; and programming logic for using the corresponding PBA for each LBA to effectuate a data transfer between the host and flash memory from the flash controller.

BRIEF DESCRIPTION OF THE DRAWINGS

The numerous advantages of the present invention may be better understood by those skilled in the art by reference to the accompanying figures in which.

Reference will now be made in detail to the presently preferred embodiments of the invention, examples of which are illustrated in the accompanying drawings.

DETAILED DESCRIPTION

Figure 1:
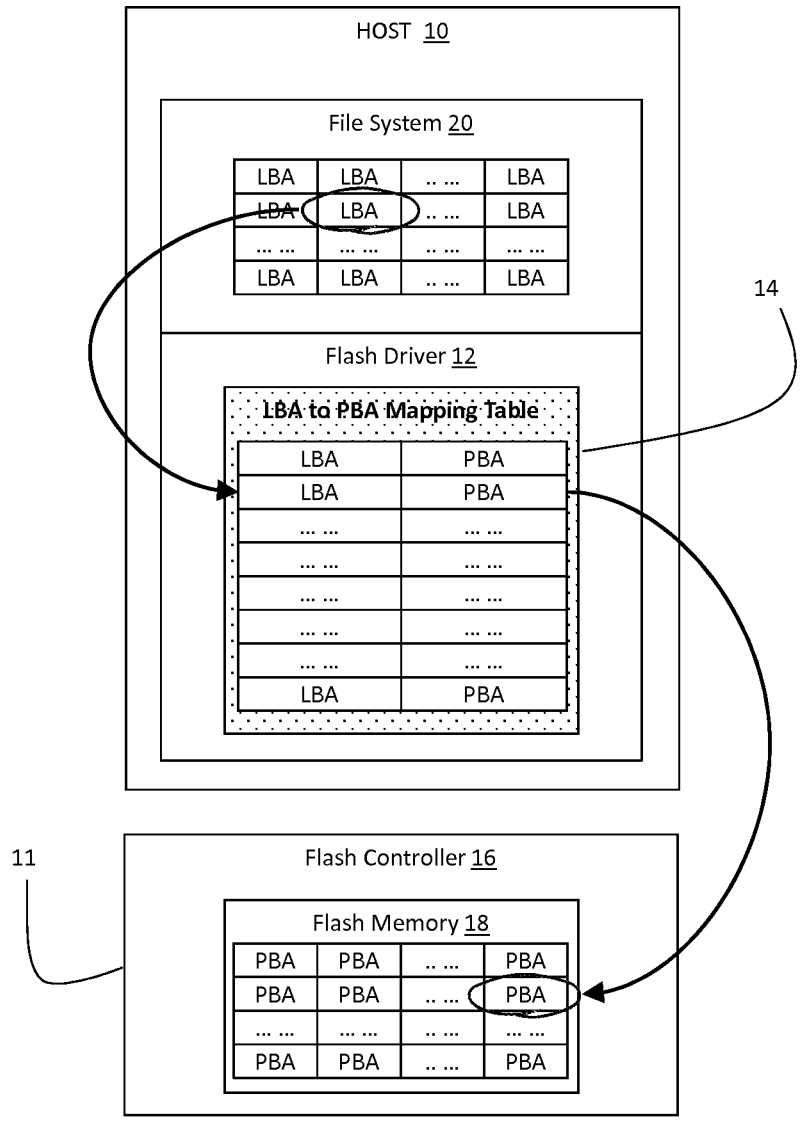
FIG. 1 is a block diagram illustrating that the host maintains the complete LBA to PBA mapping table for the file system and flash memory.
Figure 2:
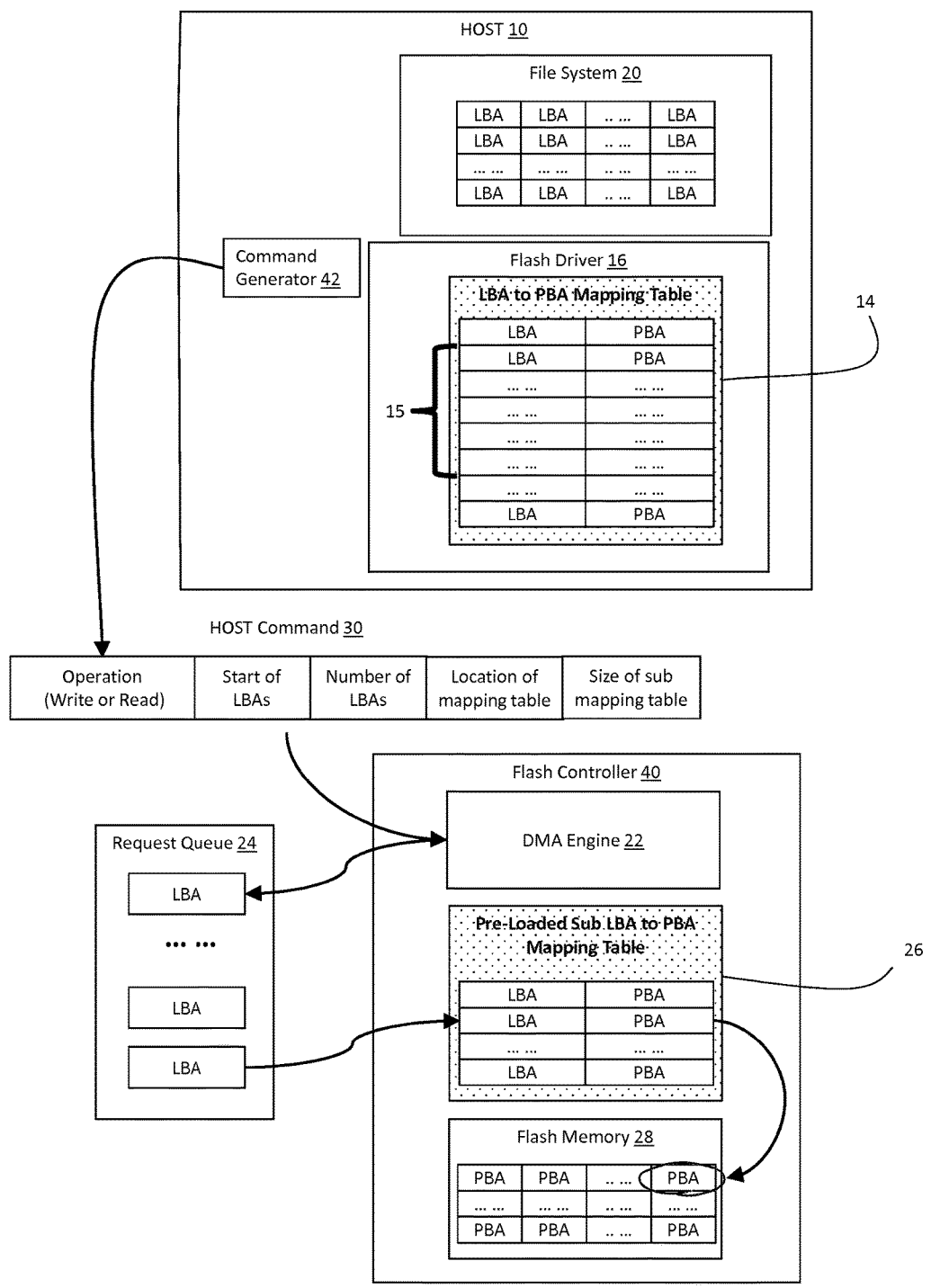
FIG. 2 is a block diagram illustrating that the host maintains the complete LBA to PBA mapping table, and the flash controller hosts a portion of the mapping table and uses the table for data movement to/from flash memory.

FIG. 2 depicts a computing infrastructure similar to the structure in FIG. 1 in which the host 10 maintains an LBA to PBA mapping table for handling data transfers between a host 10 and an external flash memory 28. The computing infrastructure of FIG. 2 however is enhanced to provide a sub-mapping scheme to reduce the amount of storage IO traffic required when exchanging data between a host 10 and external flash memory 28. In this embodiment, the host 10 includes a command generator 42 for generating a special host command 30 to initiate a data transfer between host 10 and external flash memory 28 using the sub-mapping strategy. The command generator 42 may for example be implemented in software or hardware logic capable of execution at the host. The generated host command 30 specifies a contiguous set of LBAs to be moved and specifies a portion or sub-section 15 of an LBA to PBA mapping table 14 that includes (i.e., is associated with) the set of LBAs. For instance, if LBAs at addresses 0001, 0002 and 0003 are involved in a transfer, then the subsection 15 of the LBA to PBA mapping table 14 would include three entries for LBAs at 0001, 0002 and 0003.

In response to receiving the host command 30, flash controller 40 "pre-loads" the sub-section 15 of the LBA to PBA mapping table 14 from host memory into a sub-mapping table 26 in the flash controller 40.

As noted, in existing systems such as that shown in FIG. 1 where contiguous LBAs are being written to/read from the host file system 20, a unique command is required for each LBA. In the present approach, only one host command 30 is required from host 10 for data movement involving a set of contiguous LBAs. In the illustrative embodiment of FIG. 2, the host command 30 includes: a type of operation (write or read), the start of the LBAs being processed in file system 20, a number of LBAs, a location of the sub-section 15 in the LBA to PBA mapping table 14 and a size of the sub-section 15.

When the flash controller 40 receives the host command 30, direct memory access (DMA) engine 22 retrieves sub-section 15 from the LBA to PBA mapping table 14 from host 10 containing the contiguous LBAs being processed. The sub-section 15 is stored into sub-mapping table 26 within a local storage of the flash controller 40. Each of the LBAs are also loaded into a request queue 24 for processing by the DMA engine 22. When DMA engine 22 is ready to process a next LBA, the LBA is loaded from the request queue 24 and a look-up is performed in the sub-mapping table 26 to identify the associated PBA needed to transfer the block of data to/from flash memory 28. In this manner, the flash controller 40 uses the sub-mapping table 26 to locally convert a set of contiguous LBAs to the corresponding PBAs without involving host 10.

Figure 3:
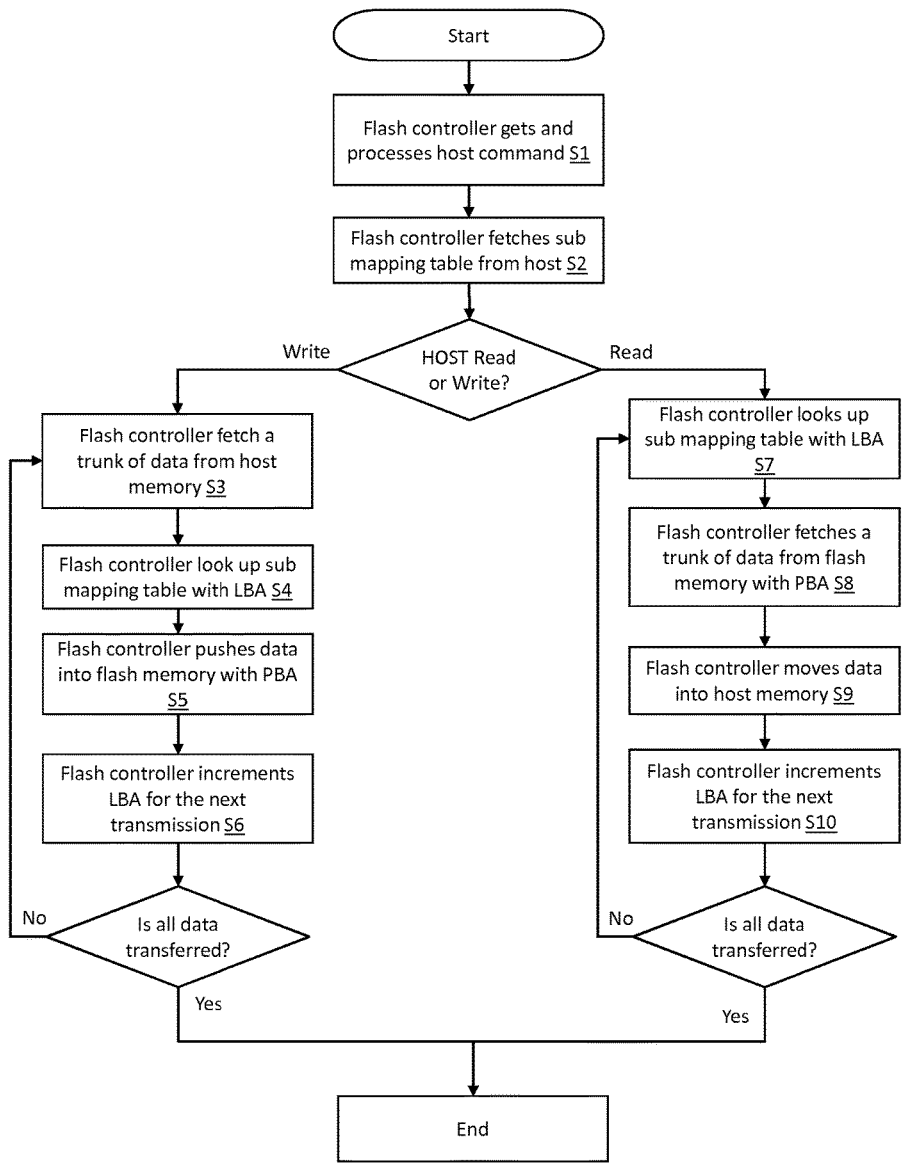
FIG. 3 is a flow diagram illustrating the case of using a sub-mapping table for data movement between host memory and flash memory to reduce storage IOs.

FIG. 3 depicts a flow diagram illustrating the process of moving data between host memory and flash memory using a sub-mapping table 26 described above. First, at S1, host 10 sends a host command 30 to the flash controller 40 with the noted information, i.e. type of operation (read or write), start of LBAs, the number of LBAs, and the location and size of the sub-section 15 that needs to be loaded into the flash controller 40. At S2, the flash controller 40 fetches the sub-section of the LBA to PBA mapping table and loads it into sub-mapping table 26, which includes all the LBAs required by the host command 30 to effectuate the data transfer. Host 10 is relieved from controlling data movement once the host command 30 is fetched and processed by flash controller 40. Flash controller 40 implements all the necessary steps for the data movement using the local sub-mapping table 26. This approach reduces both the host workload and the host-storage IOs.

For instance, in the case of a data write to the flash memory, flash controller fetches a trunk of data from host memory at S3. Flash controller 40 then performs a look-up in the sub-mapping table 26 to retrieve the PBA for a first or current LBA at S4 and pushes the associated data block into flash memory 28 at the PBA at S5. At S6, the LBA is incremented for the next data block and the process repeats until all of the LBAs are processed.

In the case of a host read, flash controller 40 performs a look-up into the sub-mapping table 26 with a first or current LBA to determine the associated PBA at S7. Flash controller 40 then fetches a trunk of data from flash memory with the PBA at S8 and the flash controller 40 moves the data block into host memory at S9. At S10, flash controller 40 increments to the next LBA and the process is repeated until all the data is transferred.

Figure 4:
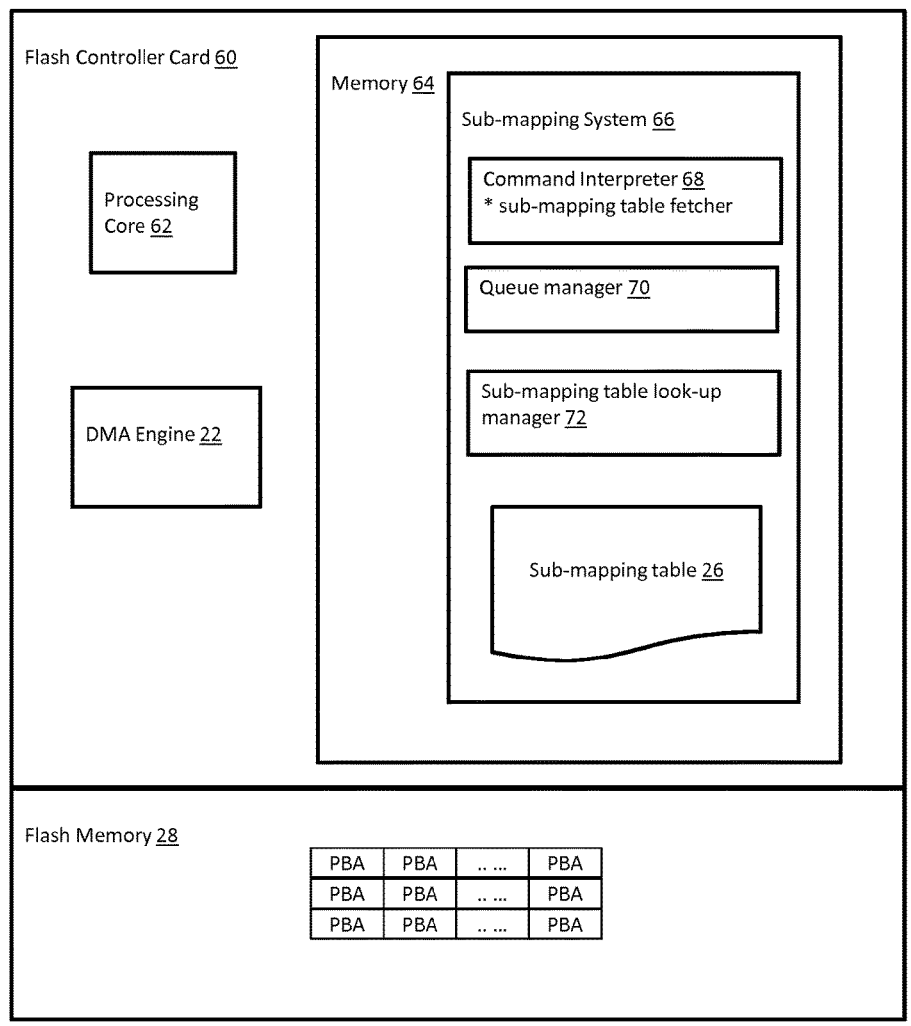
FIG. 4 depicts a flash controller card for implementing a sub-mapping strategy according to embodiments.

FIG. 4 depicts an illustrative flash controller card 60 for implementing the sub-mapping strategy. In this embodiment, a processing core 62 is utilized to execute instructions stored in memory 64 that provides a sub-mapping system 66. In particular, sub-mapping system 66 includes a command interpreter 68 to interpret the host command 30 generated by the host, fetch the sub-section 15 of the LBA to PBA mapping table 14 from the host 10, and stores the sub-section 15 in sub-mapping table 26. A queue manager 70 is provided for storing the set of contiguous LBAs associated with the data to be transferred. Also included is a sub-mapping table look-up manager 72 for performing LBA table look-ups and returning corresponding PBAs.

The method and system in accordance with an embodiment of the present disclosure is applicable to various types of storage devices without departing from the spirit and scope of the present disclosure. It is also contemplated that the term flash memory controller may refer to either logical and/or physical flash memory controller, adapter or card, and the term host may refer to various devices capable of sending read/write commands to the storage devices. It is understood that such devices may be referred to as processors, hosts, initiators, requesters or the like, without departing from the spirit and scope of the present disclosure.

It is to be understood that the present disclosure may be conveniently implemented in forms of a software package. Such a software package may be a computer program product that employs a computer-readable storage medium including stored computer code or programming logic which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A method of transferring contiguous blocks of data between a host storage and a flash memory, comprising:
   receiving from a host at a flash controller a host command that specifies a contiguous set of LBAs and specifies a corresponding sub-section of an LBA to PBA mapping table;
   fetching the sub-section of the LBA to PBA mapping table from the host and storing the sub-section in a sub-mapping table in the flash controller; and
   for each LBA in the contiguous set of LBAs, performing a look-up into the sub-mapping table in the flash controller to retrieve a corresponding PBA and using the corresponding PBA to effectuate a data transfer between the host and flash memory from the flash controller.

2. The method of claim 1, wherein the host command specifies one of a read or write operation.

3. The method of claim 2, wherein the host command specifies an LBA starting location and a number of LBAs in the contiguous set of LBAs.

4. The method of claim 3, wherein the host command specifies a size and a location of the sub-section of the LBA to PBA mapping table.

5. The method of claim 1, wherein each LBA is stored in a queue.

6. The method of claim 1, wherein the data transfer is effectuated with a direct memory access (DMA) engine.

7. A computing infrastructure for transferring contiguous blocks of data between a host storage and a flash memory, comprising:
   a command interpretter that receives a host command from a host that specifies a contiguous set of LBAs and specifies a sub-section of an LBA to PBA mapping table;
   a system for fetching the sub-section of the LBA to PBA mapping table from the host and storing the sub-section in a sub-mapping table within a flash controller;
   a system for performing a look-up into the sub-mapping table on the flash contoller to retrieve a corresponding PBA for each LBA in the contiguous set of LBAs; and
   a system for using the corresponding PBA for each LBA to effectuate a data transfer between the host and flash memory from the flash controller.

8. The computing infrastructure of claim 7, wherein the host command is generated by a command generator at the host and specifies one of a read or write operation.

9. The computing infrastructure of claim 8, wherein the host command specifies an LBA starting location and a number of LBAs in the contiguous set of LBAs.

10. The computing infrastructure of claim 9, wherein the host command specifies a size and a location of the sub-section of the LBA to PBA mapping table.

11. The computing infrastructure of claim 7, wherein each LBA is stored in a queue in the flash controller.

12. The computing infrastructure of claim 7, wherein the data transfer is effectuated with a direct memory access (DMA) engine on the flash controller.

13. A computer program product stored on a non-transitory computer readable medium, which when executed by a processing core provides an infrastructure for transferring contiguous blocks of data between a host storage and a flash memory, comprising:
   programming logic that processes a host command from a host that specifies a contiguous set of LBAs and specifies a sub-section of an LBA to PBA mapping table;
   programming logic that fetches the sub-section of the LBA to PBA mapping table from the host and stores the sub-section in a sub-mapping table within a flash controller;
   programming logic for performing a look-up into the sub-mapping table on the flash controller to retrieve a corresponding PBA for each LBA in the contiguous set of LBAs; and
   programming logic for using the corresponding PBA for each LBA to effectuate a data transfer between the host and flash memory from the flash controller.

14. The computer program product of claim 13, wherein the host command is generated by a command generator at the host and specifies one of a read or write operation.

15. The computer program product of claim 14, wherein the host command specifies an LBA starting location and a number of LBAs in the contiguous set of LBAs.

16. The computer program product of claim 15, wherein the host command specifies a size and a location of the sub-section of the LBA to PBA mapping table.

17. The computer program product of claim 16, further comprising programming logic for managing a queue for storing LBAs in the flash controller.

18. The computer program product of claim 16, wherein the programming logic to effectuate a data transfer include interfacing with a direct memory access (DMA) engine on the flash controller.

* * * * *